United States Patent [19]

Han

[11] Patent Number: 5,719,635
[45] Date of Patent: Feb. 17, 1998

[54] TELEVISION SET HAVING ALPHA-WAVE GENERATION FUNCTION

[75] Inventor: Sang-rok Han, Suwon, Rep. of Korea

[73] Assignee: Samsung Electronics Co., Ltd., Kyungki-Do, Rep. of Korea

[21] Appl. No.: 578,950

[22] Filed: Dec. 27, 1995

[30] Foreign Application Priority Data

Dec. 27, 1994 [KR] Rep. of Korea ............ 94-37543

[51] Int. Cl.$^6$ .................. H04N 5/44; H04N 5/268
[52] U.S. Cl. ................. 348/553; 348/706; 348/705; 348/552; 348/729; 348/738
[58] Field of Search ................. 348/553, 706, 348/705, 552, 729, 738; 600/26, 27, 28; H04N 5/44, 5/268

[56] References Cited

U.S. PATENT DOCUMENTS

| | | | |
|---|---|---|---|
| 4,331,977 | 5/1982 | Conn et al. | 358/190 |
| 4,903,129 | 2/1990 | Bell et al. | 348/706 |
| 5,123,899 | 6/1992 | Gall | 600/28 |
| 5,304,112 | 4/1994 | Mrklas et al. | 600/27 |
| 5,409,445 | 4/1995 | Rubins | 600/27 |
| 5,443,076 | 8/1995 | Bau | 128/731 |
| 5,470,081 | 11/1995 | Sato et al. | 273/438 |

*Primary Examiner*—John K. Peng
*Assistant Examiner*—Virek Srivastava
*Attorney, Agent, or Firm*—Sughrue, Mion, Zinn, Macpeak & Seas, PLLC

[57] ABSTRACT

A television set having an α-wave generation function includes a user key input portion, an α-wave generator, a sound producer, a first switch for selectively applying the α-wave generated by the α-wave generator to the sound producer and a controller for controlling an on/off operation of the first switch in response to a user input via the key input portion, to thereby enable a user to select the α-wave generation in the television set. Through a second switch for selectively applying an audio signal to the sound producer and a third switch for selectively supplying a video signal to a cathode ray tube of the television set, the user can control the α-wave generation simultaneously or independently from the audio and video signals.

16 Claims, 2 Drawing Sheets

TELEVISION SET HAVING ALPHA-WAVE GENERATION FUNCTION

BACKGROUND OF THE INVENTION

The present invention relates to a television set having an α-wave function, and particularly to a television set having an α-wave function which helps the sleep, wake-up and contemplation of a user.

Recently, an electronic appliance such as a computer or a television has been widely used. Accordingly, an apparatus for generating bio far-infrared or a negative ion is incorporated in a corresponding appliance for promoting health and creating a healthful atmosphere. In case of a bio far-infrared television set, the material coated on the rear surface of the Brown tube generates the far-infrared due to the heating of the Brown tube. Therefore, the far-infrared is not generated when the Brown tube does not operate. The television set incorporating a negative ion generator detects the amount of negative ions and generates negative ions via a speaker according to the detection result. The negative ions are not generated at the time when the speaker does not operate. To solve such a defect, an apparatus for generating a signal which is of benefit to human health, even when a video or audio signal is not reproduced, has been developed.

U.S. Pat. No. 3,576,185 entitled "Sleep-Inducing Method and Arrangement Using Modulated Sound and Light" discloses a technology of inducing sleep by amplitude-modulating at least one perceivable signal for a desired time at a desired period. U.S. Pat. No. 5,123,899 discloses a technology of changing a conscious state of the human using a low frequency signal such as α-wave, which has the low frequency of approximately 8-12 Hz. This is the same frequency as an the brain wave generated in brain during a contemplative state or a mental statbility state. When the human is in the wake-up state, the β-wave is generated which has the frequency of 13-18 Hz. It is known that if a human enters a state where the α-wave is generated, the body is completely relaxed in the state of a quasi-sleep and a mental activity becomes vivid and stable.

SUMMARY OF THE INVENTION

Therefore, to solve the above problems, it is an object of the present invention to provide a television set which has an α-wave generation function and selectively generates an α-wave, an audio signal, and a video signal.

To accomplish the above object of the present invention, there is provided a television set comprising:

a user key input portion; an α-wave generation portion; a sound producing portion; a first switch for selectively applying the α-wave generated by the α-wave generation portion to the sound producing portion; and a controller for controlling an on/off operation of the first switch in response to a user key input via the key input portion.

The television set further comprises a second switch for selectively applying an electric audio signal to the sound producing portion and a third switch for selectively applying a video signal of the television set to a display, wherein the controller individually controls the first through third switches in response to the user key input via the key input portion.

The controller controls individually the first through third switches according to a method selected by the user key input via the key input portion, among a first method which generates a video signal together with an audio signal mixed with an α-wave, a second method which generates a video signal together with an α-wave, and a third method which generates only an α-wave.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 1 and 2.

Figure 1:
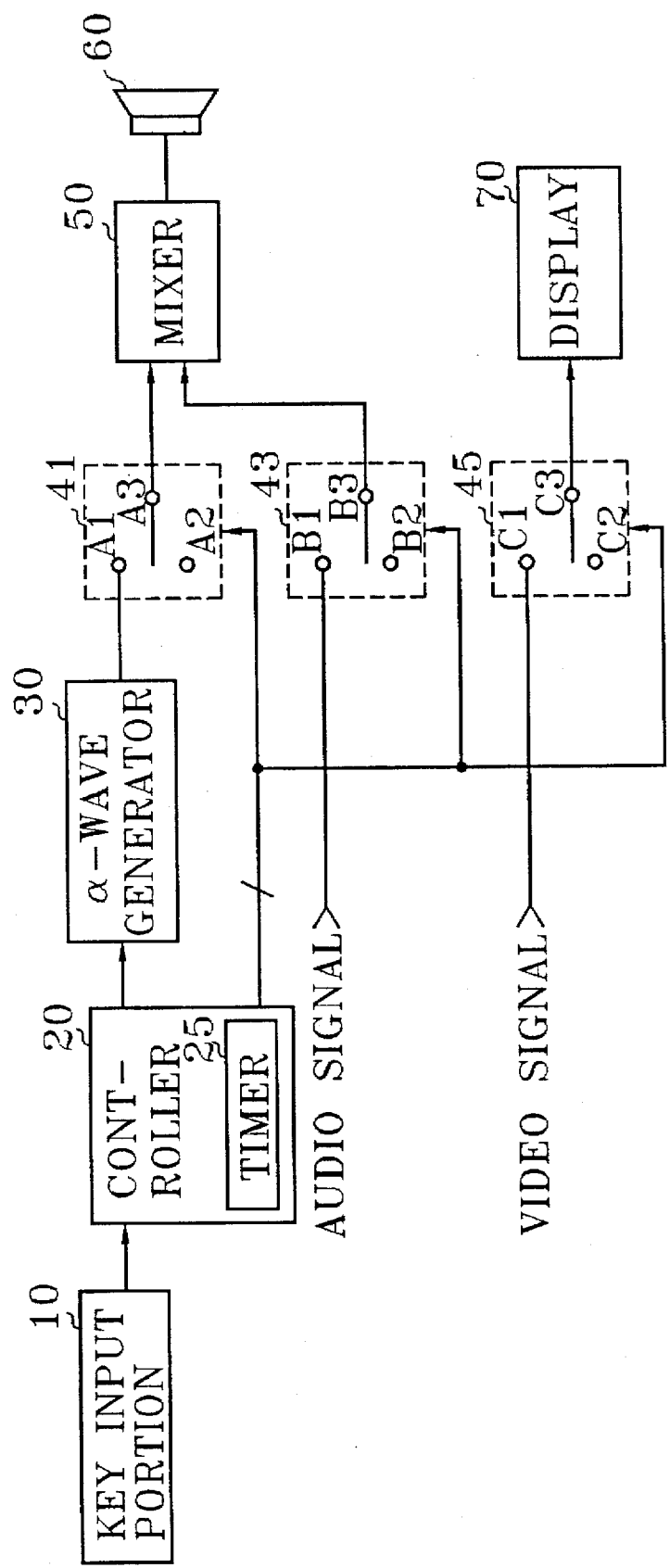
FIG. 1 is a block diagram of part of a television set having an α-wave generation function according to a preferred embodiment of the present invention.
Figure 2:
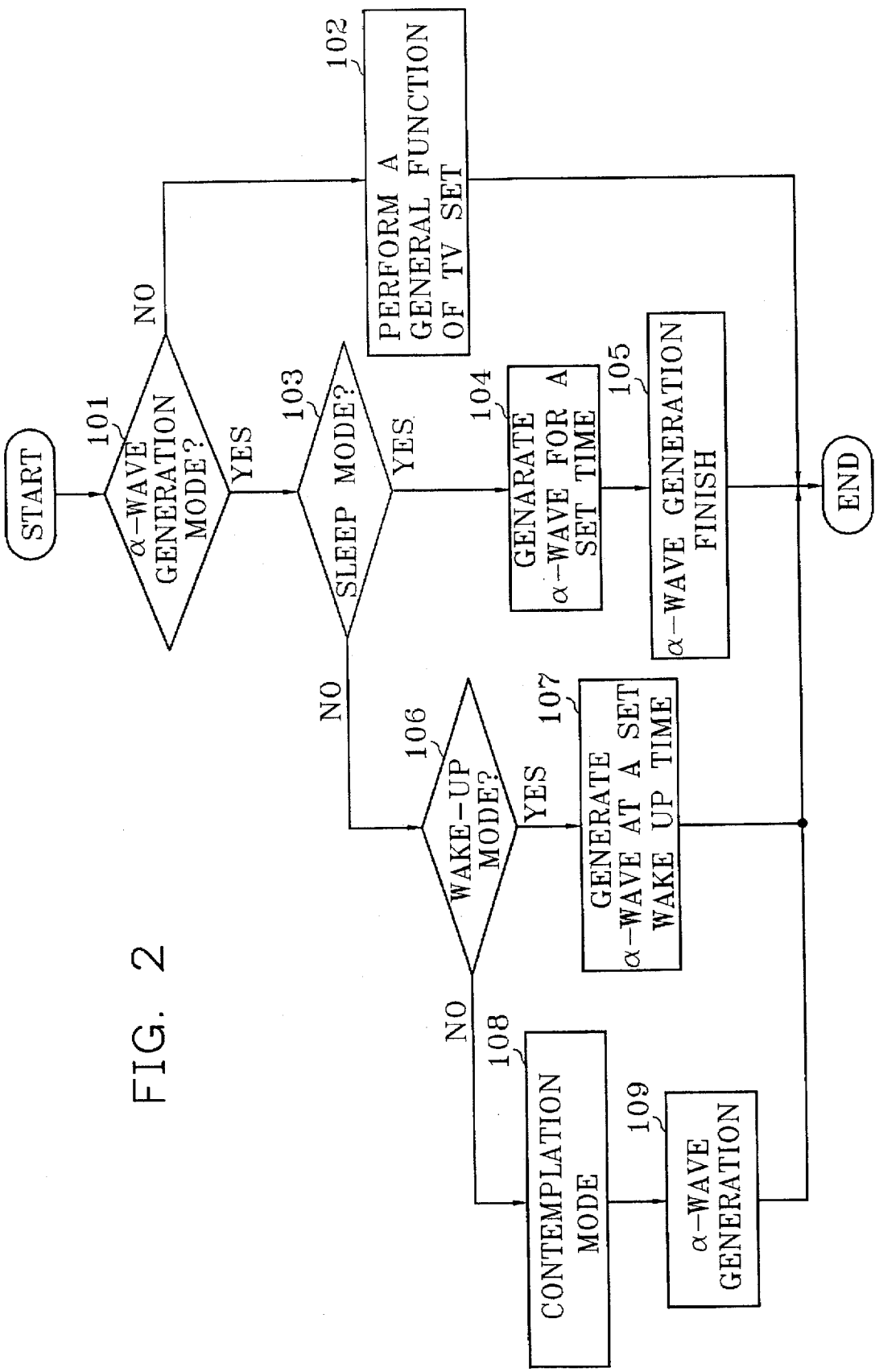
FIG. 2 is a flow-chart diagram for explaining the operation of the FIG. 1 television set.

A television set of FIG. 1 includes a key input portion 10 for selecting a desired function, a controller 20 for controlling the entire operation of the television set according to a selected function, and an α-wave generator 30. Key input portion 10 includes keys for manipulating conventional functions of the television set by a user and has a function with which a user can set and select an α-wave generation mode, a sleep mode, a wake-up mode and a contemplation mode. The latter functions can be performed by combining existing keys or by adding new keys in key input portion 10. Controller 20 can be designed using a general-purpose microprocessor which is incorporated with a timer 25. The α-wave generator 30 generates an α-wave under the control of controller 30. The generated α-wave is supplied to a mixer 50 via first switch 41. The α-wave generator 30 can use a magnetic tape or a ROM chip which can store data for generating the α-wave. When an interval of time for generating the α-wave by the data stored in the ROM chip used as the α-wave generator 30 is shorter than a required interval of time, controller 20 is designed so that the α-wave is generated for a required interval of time by repetitively using the data stored in the ROM chip. First switch 41 includes a first contact A1 which is connected to the output end an α-wave generator 30, a second contact A2 which is open, and a moving contact A3 which selects one of two contacts A1 and A2 according to a control signal of controller 20. The signal passing through moving contact A3 is supplied to a mixer 50. A second switch 43 includes a first contact B1 which receives an audio signal of the television set, a second contact B2 which is open, and a moving contact B3 which selects one of two contacts B1 and B2 according to the control signal of controller 20. The signal passing through moving contact B3 is supplied to mixer 50. The mixer 50 mixes the output signals from first and second switches 41 and 43. A speaker 60 converts the mixed signal into a sound signal. A third switch 45 includes a first contact C1 which receives a video signal of the television set, a second contact C2 which is open, and a moving contact C3 which selects one of two contacts C1 and C2 according to the control signal of controller 20. The output of third switch 45 is applied to a cathode ray tube (CRT) 70 for displaying the video signal.

The operation of the FIG. 1 apparatus having the above-described construction will be described below with reference to FIG. 2.

The α-wave generation mode includes a sleep mode, a wake-up mode and a contemplation mode. These modes are set by a user's manipulation of key input portion 10.

Controller 20 stores information relating to each mode set by the user. The information stored in controller 20 includes a wake-up mode start time, an interval of time for which an α-wave is generated relative to the wake-up mode start time, a sleep mode start time, an interval of time for which the α-wave is generated relative to the sleep mode start time and an α-wave generation interval of time for an contemplation mode. Controller 20 stores information on a first method which generates a video signal together with an audio signal mixed with an α-wave, a second method which generates a video signal together with an α-wave, and a third method which generates only an α-wave, in correspondence to a sleep mode, a wake-up mode and a contemplation mode, respectively. Such information is set when the user sets the sleep mode, the wake-up mode and the contemplation mode, respectively.

Controller 20 judges whether an α-wave mode is set by key input via key input portion 10 in step 101. If it is judged that the α-wave mode is not set in step 101, controller 20 controls an α-wave generator 30 so that the α-wave is not generated, and the television set performs a general function in step 102. In step 102, controller 20 controls second switch 43 so that moving contact B3 is connected to first contact B1 which receives an audio signal of the television and controls third switch 45 so that moving contact C3 is connected to first contact C1 which receives a video signal of the television. The audio signal passing through mixer 50 is changed into a sound signal which a user can listen to via speaker 60. The video signal passing through third switch 45 is displayed via CRT 70 so that the user can watch it.

If it is judged that the α-wave generation mode is set in step 101, controller 20 performs steps 103 and 106 and judges whether it should operate according to a sleep mode, a wake-up mode or a contemplation mode. Controller 20 judges whether it is in a sleep mode based on the stored information in step 103. Such a mode judgement is accomplished by comparison of the wake-up mode start time and the sleep mode start time stored in controller 20 with a reference time generated in timer 25. If it is a sleep mode, α-wave generator 30 generates the α-wave for a set interval of time such as thirty minutes, sixty minutes, ninety minutes or one hundred twenty minutes under the control of controller 20 in step 104. At this time, controller 20 controls the α-wave generation operation of α-wave generator 30 on the basis of the reference time of timer 25. First switch 41 supplies the α-wave applied from α-wave generator 30 to mixer 50. After the set time lapses, controller 20 controls α-wave generator 30 so that the α-wave generation completes in step 105.

When the television set operates in the above-described first method in connection with the operation of the sleep mode, first switch 41 supplies the output of α-wave generator 30 to mixer 50, second switch 43 supplies the audio signal of the television set to mixer 50, and third switch 45 supplies the video signal of the television set to CRT 70. Therefore, the first method in the sleep mode induces the user to a natural sleep state during viewing of the video signal of the television set and listening to the accompanying audio signal.

When the television set operates in the above-described second method, first switch 41 supplies the output of α-wave generator 30 to mixer 50, and second switch 43 does not supply the audio signal to mixer 50. Third switch 45 supplies the video signal of the television set to CRT 70. Therefore, the second method induces the user to a natural sleep state while the user views only the video signal displayed by the television set.

When the television set operates in the third method, second and third switches 43 and 45 are individually disconnected from the audio and video signals of the television set from mixer 50 and CRT 70 respectively. Then, first switch 41 supplies the α-wave generated in α-wave generator 30 to mixer 50. Here, controller 20 judges whether a set interval of time lapses on the basis of the reference time generated in timer 25. If the set interval of time lapses, controller 20 controls α-wave generator 30 so that the α-wave is not generated. Therefore, since the third method makes the television set generate only the sound of the α-wave, the user is induced to sleep at a more preferred atmosphere for the user. In the third method of the sleep mode, the user can arbitrarily set an interval of time by which α-wave generator 30 operates. Thus, when the user sets a long interval of time for a sleep mode just before it reaches a wake-up mode start time, controller 20 controls α-wave generator 30 so that the α-wave is generated until the stored wake-up mode start time is reached. If it becomes a wake-up mode start time during operation of the sleep mode, controller 20 can be programmed so that the present mode is changed from the sleep mode to the wake-up mode. If the television set is turned on in response to the set wake-up mode start time, controller 20 can be programmed so that the sleep mode can be automatically released.

Meanwhile, if the mode in step 103 is not a sleep mode, controller 20 judges whether the mode in step 106 is a wake-up mode based on the stored information. The execution in step 106 is accomplished in the same manner as that of step 103. When a reference time of timer 25 matches the set wake-up mode start time, controller 20 controls α-wave generator 30 so that the α-wave is generated in step 107. Controller 20 also controls the α-wave generator 30 so that the α-wave is not generated if a preset interval of time lapses. Preferably, the television set is programmed so that it operates in the first or second method in the wake-up mode. Since the operation of the first or second method in the wake-up mode can be appreciated by those skilled in the art from the description of the above sleep mode, the detailed description thereof will be omitted. When the television set operates as the first method in the wake-up mode, the user watches the video and audio signals of the television set, and simultaneously stimulated by the α-wave, with a result that the user is induced to awaken. When the television set operates as the second method in the wake-up mode, the user does not only feel uncomfortable due to the audio signal but also is automatically induced to be awakened.

If it is judged that a mode in step 106 is not the wake-up mode, controller 20 operates in a contemplation mode. Preferably, the television set operates in the third method during the contemplation mode. However, it is possible for the television set to operate in the first or second method.

It is also possible to modify the FIG. 1 apparatus so that only the α-wave and the audio signal can be reproduced. The above-described apparatus according to the embodiment of the present invention is designed so that it automatically operates in the sleep mode, the wake-up mode and the contemplation mode after the α-wave generation mode is set. However, it is apparent to those skilled in the art that there is a modification by which the user can manually select each mode.

As described above, the present invention enables the television set to generate the α-wave, and the user to select the α-wave generation. Thus, the user can watch the TV in a relaxed state. Also, since the α-wave can be generated simultaneously or independently with respect to the audio signal and the video signal, the present invention can help the sleep, wake-up and contemplation of the user.

While only certain embodiments of the invention have been specifically described herein, it will apparent that numerous modifications may be made thereto without departing from the spirit and scope of the invention.

What is claimed is:

1. A television set comprising:
   a user key input portion;
   an α-wave generation portion;
   a sound producing portion;
   a first switch for selectively applying an α-wave generated by the α-wave generation portion to said sound producing portion; and
   a controller for controlling an operation of said first switch in response to a user input via said key input portion.

2. The television set according to claim 1, further comprising a second switch for selectively applying an electric audio signal to said sound producing portion, wherein said controller controls an operation of said second switch in response to the user key input via said input portion.

3. The television set according to claim 1, further comprising a display; and a second switch for selectively applying a video signal of the television set to said display, wherein said controller controls an operation of said second switch in response to the user input via said key input portion.

4. The television set according to claim 1, further comprising a second switch for selectively applying an electric audio signal to the sound producing portion; a display; and a third switch for selectively applying a video signal of the television set to said display, wherein the controller individually controls the first through third switches in response to the user key input via the input portion.

5. The television set according to claim 4, wherein said controller controls individually the first through third switches according to a method selected by the user input via the key input portion, said method selected from a first method which generates the video signal together with the audio signal mixed with the α-wave, a second method which generates the video signal together with the α-wave, and a third method which generates only the α-wave.

6. The television set according to claim 4, wherein said controller comprises a timer for generating a reference time; and a microprocessor for storing a wake-up mode start time and a selected interval of time for which the α-wave is generated relative to the wake-up mode start time, and
   wherein said microprocessor controls said α-wave generator so that the α-wave is generated for said interval of time from when the wake-up mode start time is congruous with the reference time generated by said timer if an α-wave generation mode is set by the user input, and controls said first switch so that the generated α-wave is output via said sound producing means.

7. The television set according to claim 4, wherein said controller comprises a timer for generating a reference time; and a microprocessor for storing a sleep mode start time and an interval of time for which the α-wave is generated relative to the sleep mode start time, and
   wherein said microprocessor controls said α-wave generator so that the α-wave is generated for said interval of time from when the sleep mode start time is congruous with the reference time generated by said timer, if an α-wave generation mode is set by the user key input, and controls said first switch so that the generated α-wave is output via said sound producing means.

8. A television set comprising:
   a user key input portion;
   an α-wave generation portion;
   a sound producing portion;
   a frequency mixer for processing at least one of: an α-wave generated by said α-wave generation portion and an audio signal of the television set;
   a first switch for selectively applying the α-wave generated by the α-wave generation portion to said frequency mixer, the output of said frequency mixer being applied to said sound producing portion; and
   a controller for controlling an operation of said first switch in response to a user input via said key input portion.

9. The television set according to claim 8, further comprising a second switch for selectively applying the audio signal of the television to said frequency mixer;
   a display; and
   a third switch for selectively applying a video signal of the television set to said display, wherein the controller individually controls the first through third switches in response to the user input via the key input portion.

10. The television set according to claim 9, wherein said controller independently controls the first through third switches according to a user input via the key input portion.

11. The television set according to claim 10, wherein said controller comprises a timer for generating a reference time; and a microprocessor for storing a wake-up mode start time and a selected interval of time for which the α-wave is generated relative to the wake up start mode, and
    wherein said microprocessor controls said α-wave generator so that the α-wave is generated for said interval of time from when the wake-up mode start time is congruous with the reference time generated by said timer if an α-wave generation mode is set by the user input, and controls said first switch so that the generated α-wave is output via said sound producing means.

12. The television set according to claim 10, wherein said controller comprises a timer for generating a reference time; and a microprocessor for storing a sleep mode start time and a selected interval of time for which the α-wave is generated relative to the sleep mode start time, and
    wherein said microprocessor controls said α-wave generator so that the α-wave is generated for said interval of time from when the sleep mode start time is congruous with the reference time generated by said timer if an α-wave generation mode is set by the user input, and controls said first switch to that the generated α-wave is output via said sound producing means.

13. A television set receiving an audio and a video signal as a broadcast signal and comprising:
    a user key input portion;
    an α-wave generation portion;
    a display;
    a sound producing portion;
    a frequency mixer for processing at least one of: an α-wave generated by said α-wave generation portion and the audio signal;
    a first switch for selectively applying the α-wave generated by the α-wave generation portion to said frequency mixer, the output of said frequency mixer being applied to said sound producing portion; and
    a second switch for selectively applying the audio signal to said frequency mixer;

a third switch for selectively applying the video signal to the display, and a controller wherein the controller individually controls the first, second and third switches in response to the user input via the key input portion.

14. The television set according to claim 13, wherein said controller independently controls the first through third switches according to a user input via the key input portion.

15. The television set according to claim 14, wherein said controller comprises a timer for generating a reference time; and a microprocessor for storing a wake-up mode start time and a selected interval of time for which the α-wave is generated relative to the wake up start mode, and wherein said microprocessor controls said α-wave generator so that the α-wave is generated for said interval of time from when the wake-up mode start time is congruous with the reference time generated by said timer if an α-wave generation mode is set by the user input, and controls said first switch so that the generated α-wave is output via said sound producing means.

16. The television set according to claim 14, wherein said controller comprises a timer for generating a reference time; and a microprocessor for storing a sleep mode start time and an interval of time for which the α-wave is generated relative to the sleep mode start time, and wherein said microprocessor controls said α-wave generator so that the α-wave is generated for storing interval of time from when the sleep mode start time is congruous with the reference time generated by said timer if an α-wave generation mode is set by the user input, and controls said first switch so that the generated α-wave is output via said sound producing means.

* * * * *